US008472813B2

(12) United States Patent
Cvijetic et al.

(10) Patent No.: US 8,472,813 B2
(45) Date of Patent: Jun. 25, 2013

(54) COMPUTATIONALLY-EFFICIENT MIMO EQUALIZATION ALGORITHM FOR HIGH-SPEED, REAL-TIME, ADAPTIVE POLARIZATION MULTIPLEXED (POLMUX) OFDM TRANSMISSION WITH DIRECT DETECTION

(75) Inventors: Neda Cvijetic, Princeton, NJ (US); Narayan Prasad, Monmouth Junction, NJ (US); Dayou Qian, Princeton, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 430 days.

(21) Appl. No.: 12/818,154

(22) Filed: Jun. 18, 2010

(65) Prior Publication Data

US 2011/0310951 A1 Dec. 22, 2011

(51) Int. Cl.
*H04B 10/00* (2006.01)
*H04B 10/12* (2006.01)

(52) U.S. Cl.
USPC ........... 398/205; 398/202; 398/206; 398/208; 398/209; 398/213

(58) Field of Classification Search
USPC ................................................. 398/202–214
See application file for complete search history.

(56) References Cited

U.S. PATENT DOCUMENTS

2009/0274469 A1* 11/2009 Yuki et al. ..................... 398/152
2010/0086303 A1* 4/2010 Qian et al. ..................... 398/65
2011/0194855 A1* 8/2011 Batshon et al. ................. 398/65

OTHER PUBLICATIONS

D. Qian, N. Cvijetic, Y.K. Huang, J. Yu and T. Wang, "40-Gb/s MIMO-OFDM-PON Using Polarization Multiplexing and Direct-Detection, " in Proc. OFC 2009, paper OMV3.
D. Qian, N. Cvijetic, Y.K. Huang, J. Yu and T. Wang, "108 Gb/s OFDMA-PON with Polarization Multiplexing and Direct-Detection," in Proc. OFC 2009, paper PDPD5.
A. Al Amin, H. Takahashi, I. Morita, H. Tanaka, "Polarization Multiplexed 100 Gbps Direct-Detection OFDM Transmission without MIMO Processing," in Proc. ECOC 2009, paper 1.3.1.
N. Prasad, S. Wang, X. Wang, "Efficient Receiver Algorithms for DFT-Spread OFDM Systems", *IEEE Trans. Wireless Commun.*, 8(6):3216-3225, 2009.

* cited by examiner

*Primary Examiner* — Kenneth N Vaderpuye
*Assistant Examiner* — Daniel Dobson
(74) *Attorney, Agent, or Firm* — Bao Tran; Joseph Kolodka

(57) ABSTRACT

A polarization-multiplexed (POLMUX) optical orthogonal frequency division multiplexing (OFDM) system with direct detection includes an adaptive dual POLMUX carrier OFDM transmitter; and a block symmetric (B-S) MIMO equalizer coupled to the adaptive dual POLMUX carrier OFDM transmitter through a standard single-mode-fiber (SSMF) feedback path.

30 Claims, 3 Drawing Sheets

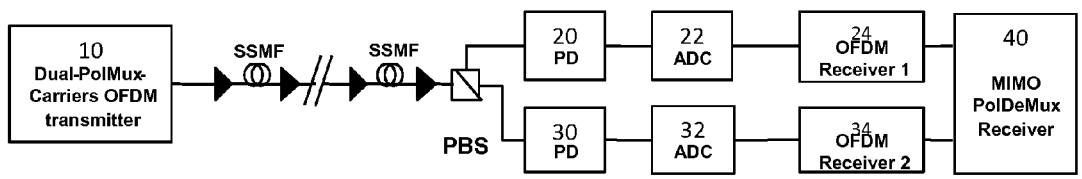
FIG. 1 – Prior Art
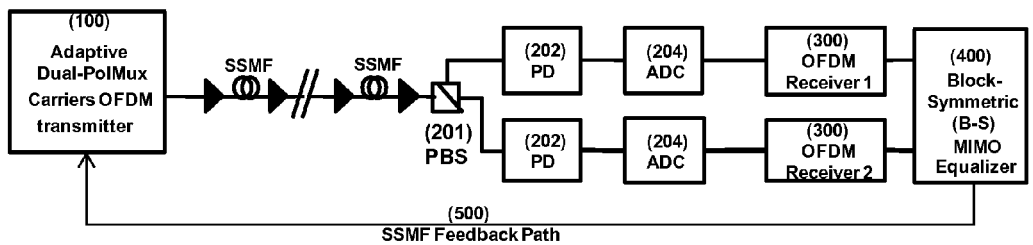
FIG. 2
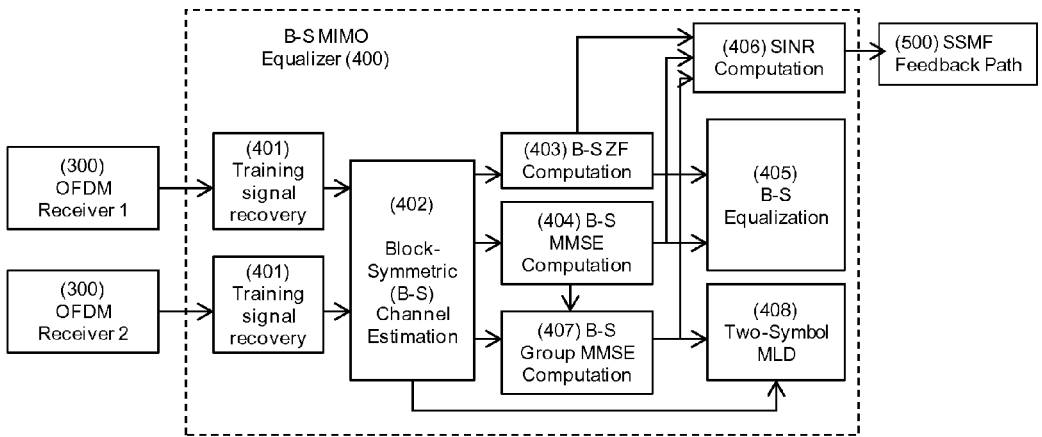
FIG. 3

COMPUTATIONALLY-EFFICIENT MIMO EQUALIZATION ALGORITHM FOR HIGH-SPEED, REAL-TIME, ADAPTIVE POLARIZATION MULTIPLEXED (POLMUX) OFDM TRANSMISSION WITH DIRECT DETECTION

BACKGROUND

This application relates to systems and methods for OFDM transmission.

With video traffic set to account for over 90% of all network traffic by 2012, the transport capacity of next-generation optical access/metro networks (<600 km) will migrate to 40-Gb/s or 100-Gb/s per channel in the near future. However, unlike high-speed long-haul systems (1000+ km) that can offset a high implementation cost, it is critical that technologies for future optical access/metro networks be both highly cost-efficient and flexible in order to be attractive candidates for next-generation systems.

Due to high spectral efficiency, resilience to linear dispersion, and efficient digital signal processing (DSP)-based implementation, optical orthogonal frequency division multiplexing (OFDM) has emerged as an attractive candidate for future fiber-optic systems. Moreover, optical OFDM-based Multiple Access (OFDMA) is attractive for next-generation optical access/metro systems due to its application transparency and bandwidth flexibility. To further increase spectral efficiency at ultra high-speeds with reduced optical receiver complexity and cost, polarization-multiplexed (POLMUX) OFDM transmission with direct (non-coherent) detection (POLMUX-OFDM-DD) has been proposed and demonstrated. By achieving record 40+ Gb/s data rates with simplified optical receivers, POLMUX-OFDMA with direct detection (DD) is a highly-promising technology for future fiber-based access/metro systems.

However, while POLMUX-OFDM-DD systems reduce receiver complexity compared to coherent receivers, they also increase the complexity of the required post-photodetection electronic DSP. Namely, due to direct detection, cross-polarization interference will occur in the optical receiver, which must be corrected, or equalized, in post-photodetection DSP. Unlike in POLMUX-OFDM systems with coherent detection, however, with POLMUX-OFDM-DD, the inverse of a 4×4 channel estimation matrix must be computed to do so. The computational complexity of this task alone for an M×M matrix grows as $O(M^3M)$. This means that for M=4, a single execution of the task would increase complexity by $M^3M=256$ digital operations. Combined with the thousand-fold repetition per second needed for equalization of the cross-polarization interference, the matrix inversion alone would increase the computational complexity by ~$10^5$ operations/second. Such an increase from one task is fundamentally prohibitive for real-time high-speed (40+ Gb/s) POLMUX-OFDM-DD systems. Moreover, equalization based on the direct matrix inversion, known as zero forcing (ZF), is known to degrade performance by enhancing noise effects. Consequently, a computationally-efficient equalization algorithm that can also remove noise enhancement is of high importance for high-speed, real-time POLMUX-OFDM-DD systems.

FIG. 1 shows a conventional POLMUX-DD-OFDM system. In FIG. 1, a POLMUX-OFDM signal is generated in the Dual-PolMux OFDM transmitter and transmitted over standard single mode fiber (SSMF). As shown in FIG. 1, the Dual-PolMux OFDM transmitter is non-adaptive since it has no information about the SSMF link quality and cannot adjust its parameters to optimize the transmission rate. At the receiver, the POLMUX-OFDM signal is split into two components by a polarization beam splitter (PBS) and direct-detected by two photo-diodes (PD). After analog-to-digital conversion (ADC), each component is processed by an OFDM receiver, and sent to the MIMO PolDeMux receiver. The DSP-based PolDeMux receiver performs equalization of the cross-polarization interference which occurs during photodetection. Specifically, using the output of the OFDM receivers, the PolDeMux receiver obtains the following model, wherein for simplicity no additive noise is assumed:

$$\underbrace{\begin{bmatrix} c_{X,ch1}a_{11} & c_{Y,ch1}b_{21} & c_{Y,ch1}b_{11} & c_{X,ch1}a_{21} \\ c_{Y,ch1}a_{11} & c_{X,ch1}b_{21} & c_{X,ch1}b_{11} & c_{Y,ch1}a_{21} \\ c_{X,ch2}a_{12} & c_{Y,ch2}b_{22} & c_{Y,ch2}b_{12} & c_{X,ch2}a_{22} \\ C_{Y,ch2}a_{12} & c_{X,ch2}b_{22} & c_{X,ch2}b_{12} & c_{Y,ch2}a_{22} \end{bmatrix}}_{\text{PolMux channel estimation matrix}} \times \underbrace{\begin{bmatrix} X_i \\ X_{n-i+1} \\ Y_i \\ Y_{n-i+1} \end{bmatrix}}_{\text{Tx signals}} = \underbrace{\begin{bmatrix} X'_i \\ X'_{n-i+1} \\ Y'_i \\ Y'_{n-i+1} \end{bmatrix}}_{\text{Re signals}}$$

PolMux channel estimation matrix; Tx = transmitted; Re = received

In the PolMux channel estimation matrix, the coefficients a and b are the power splitting ratios caused by polarization rotation, and c is decided by the power difference between the optical carrier and the OFDM signal. Moreover, no matrix structure is apparent from the PolMux matrix formulation. Next, the PolDeMux receiver of FIG. 1 computes the inverse of the channel estimation matrix, i.e. the PolDeMux matrix, and performs the equalization by directly multiplying the inverse matrix with the received (Re) signals. This multiplication step is also known as zero forcing (ZF). It is also noted that no matrix structure is apparent from the PolDeMux matrix formulation below:

$$\underbrace{\begin{bmatrix} c_{X,ch1}a_{11} & c_{Y,ch1}b_{21} & c_{Y,ch1}b_{11} & c_{X,ch1}a_{21} \\ c_{Y,ch1}a_{11} & c_{X,ch1}b_{21} & c_{X,ch1}b_{11} & c_{Y,ch1}a_{21} \\ c_{X,ch2}a_{12} & c_{Y,ch2}b_{22} & c_{Y,ch2}b_{12} & c_{X,ch2}a_{22} \\ C_{Y,ch2}a_{12} & c_{X,ch2}b_{22} & c_{X,ch2}b_{12} & c_{Y,ch2}a_{22} \end{bmatrix}^{-1}}_{\text{PolDeMux matrix}} \times \underbrace{\begin{bmatrix} X'_i \\ X'_{n-i+1} \\ Y'_i \\ Y'_{n-i+1} \end{bmatrix}}_{\text{Re signals}} = \underbrace{\begin{bmatrix} X_i \\ X_{n-i+1} \\ Y_i \\ Y_{n-i+1} \end{bmatrix}}_{\text{Tx signals}}$$

For a M×M=4×4 matrix with no apparent structure, a single PolDeMux matrix computation via direct inversion of the channel estimation matrix would increase the computational complexity by $M^3M=256$ digital operations. Combined with the thousand-fold repetition per second needed for equalization of the cross-polarization interference, the matrix inversion alone would increase the computational complexity by about $10^5$ operations/second, which is fundamentally prohibitive for real-time 40+ Gb/s POLMUX-OFDM-DD systems. Moreover, in practice equalization based on direct multiplication of the PolDeMux matrix with the received (Re) signals, known as zero forcing (ZF), degrades performance by enhancing noise effects.

Another POLMUX-OFDM-DD system solves the cross-polarization interference problem through optical rather than electronic processing. Namely, at the receiver, the POLMUX-OFDM signal is split into two components, and a sharp optical filter is used to remove the carrier in one polarization. The cross-polarization interference is thus removed and DSP-based equalization is not needed. However, this approach increases the optical receiver complexity, since two very sharp, costly optical filters must be used. It also incurs a prohibitive 10+ dB penalty in the required optical signal to noise ratio (OSNR), compared to the system of FIG. 1.

SUMMARY

A polarization-multiplexed (POLMUX) optical orthogonal frequency division multiplexing (OFDM) system with direct detection includes an adaptive dual POLMUX carrier OFDM transmitter; and a block symmetric (B-S) MIMO equalizer coupled to the adaptive dual POLMUX carrier OFDM transmitter through a standard single-mode-fiber (SSMF) feedback path.

Advantages of the preferred embodiments may include one or more of the following. The system maintains spectral and cost efficiency of the conventional POLMUX-OFDM-DD system (FIG. 1), while reducing the required DSP computational complexity for high-speed (40+ Gb/s), real-time applications. It also enables computationally-efficient equalization that does not enhance noise and either approaches or achieves theoretically optimal maximum likelihood (ML) detection. Finally, it enables efficient transmitter-end adaptation based on the physical link quality, which maximizes the transmission rate and greatly enhances system flexibility. The system provides a computationally-efficient equalization process that can also remove noise enhancement and is of high importance for high-speed, real-time POLMUX-OFDM-DD systems. Furthermore, to maximize the transmission rate and enhance flexibility, the system adapts the transmitter-end parameters of a multi-user OFDMA-PON, such as the modulation and coding formats, based on the link quality for a given user in the system. Efficiently enabling transmitter-end adaptation based on link quality is important for transmission rate optimization and overall flexibility of POLMUX-OFDM-DD systems.

BRIEF DESCRIPTION OF THE DRAWINGS

FIG. 1 shows a conventional POLMUX-DD-OFDM system.

FIG. 2 shows an exemplary POLMUX-DD-OFDM system having an adaptive transmitter and a computationally-efficient block-symmetric (B-S) MIMO equalizer.

FIG. 3 shows a computationally-efficient block-symmetric (B-S) MIMO equalizer with signal to interference and noise ratio (SINR) feedback.

DESCRIPTION

Figure 4:
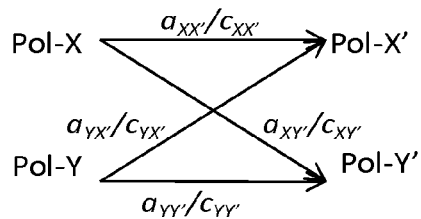
FIG. 4 shows the operation of the B-S MIMO Equalizer (400) of FIG. 3.

FIG. 2 shows an exemplary POLMUX-DD-OFDM system having an adaptive transmitter and a computationally-efficient block-symmetric (B-S) MIMO equalizer. As shown in FIG. 2, the POLMUX-OFDM signal is generated by a Dual-PolMux-Carriers transmitter (100) and then transmitted through SSMF and optical amplifiers. At a receiver side, the POLMUX-OFDM signal is separated by a PBS (201), with the two PBS (201) outputs are photodetected by two PDs (202) and digitized by two parallel ADCs (204). The OFDM receivers (300) down-convert the electrical radio frequency (RF) OFDM signal to baseband and perform the digital in-phase/quadrature (I/O) demultiplexing. The OFDM receivers (300) output the frequency-domain data signals containing the cross-polarization interference to the Block-Symmetric (B-S) MIMO Equalizer (400), which separates the data in each polarization in a computationally efficient way. FIG. 3 shows the detailed architecture of the B-S MIMO Equalizer (400).

The system uses a highly computationally-efficient equalization process for POLMUX-OFDM-DD systems. By recognizing and exploiting a block-symmetric (B-S) structure in the 4×4 channel estimation matrix to significantly reduce the computational complexity, the system enables equalization without noise enhancement. The system can approach theoretically optimal maximum likelihood (ML) detection, in high-speed, real-time POLMUX-OFDM-DD applications, such as OFDMA-PON. Moreover, the B-S Equalizer enables efficient transmitter-end adaptation based on the physical link quality, which maximizes the transmission rate and greatly enhances system flexibility.

FIG. 3 shows a computationally-efficient block-symmetric (B-S) MIMO equalizer with signal to interference and noise ratio (SINR) feedback. The SINR is used as the metric for assessing link quality. As shown in FIG. 3, at the output of the OFDM receivers (300), training signal recovery (401) is first performed. Next, the B-S channel estimation is performed (402). The estimation output is provided to a B-S zero-forcing (ZF) operation (403), a Minimum Mean Square Error (MMSE) matrix operation (404), and a group MMSE operation (407). From (403) and (404), a B-S equalization is done (405), while from (407), a Two-Symbol Maximum Likelihood Demodulation (MLD) is performed (408). The output of operations (403, 404 and 407) are provided to a SINR determination (406), which generates a standard single-mode-fiber (SSMF) feedback path (500).

The operation of the B-S MIMO Equalizer (400) of FIG. 3 for each OFDM subcarrier is based on the channel model shown in FIG. 4. As shown by FIG. 4, due to polarization rotation, signal components on each of the two input polarization states, Pol-X and Pol-Y, may migrate to one of the output polarization states, Pol-X' and Pol-Y'. The notation XY', for example, denotes component migration from input polarization Pol-X to output polarization Pol-Y'. Moreover, in FIG. 4, coefficients a and c are used to denote the polarization rotation of the OFDM databand and optical carrier signals, respectively. Thus, $a_{XY'}$ denotes the channel coefficient experienced by the OFDM data band component that migrates from Pol-X to Pol-Y', while $c_{XY'}$ refers to the coefficients decided by the portion of the optical carrier launched from Pol-X that ends up in Pol-Y'. It is also noted that the coefficients a and c generally change from subcarrier to subcarrier.

Figure 5:
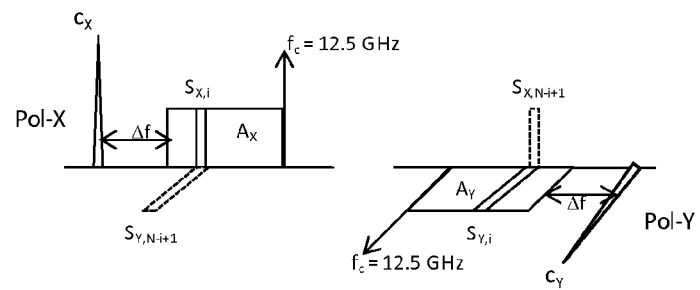
FIGS. 5 and 6 show training signals used in the training operation 401 of FIG. 3.
Figure 6:
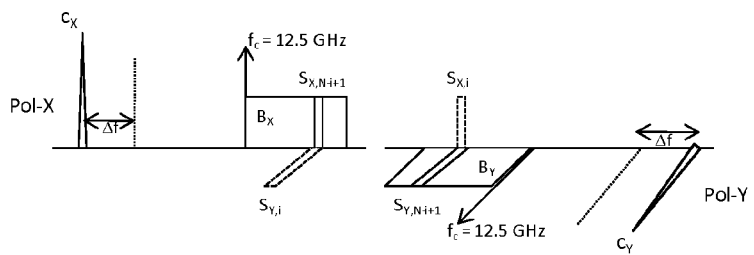

Turning now to the training operation 401 of FIG. 3, the training signals, shown in FIGS. 5-6, were composed of two different training sets: A and B. Training set A, shown in FIG. 5, consists of subsets $A_X$ and $A_Y$ during which known symbols are transmitted on OFDM subcarriers in the frequency range $\Delta f$-$f_c$ in Pol-X and Pol-Y, respectively. In FIGS. 5-6, an exemplary $f_c$ is 12.5 GHz for illustration, without loss of generality. The notation $S_{X,i}$ denotes the complex baseband OFDM symbol modulated in Pol-X onto the $i^{th}$ FDM subcarrier; $S_{X,N-i+1}$ carriers an analogous meaning, where N is the FFT size. In a similar manner, $S_{Y,i}$ and $S_{Y,N-i+1}$ respectively denote the complex OFDM symbols on the $i^{th}$ and $(N-i+1)^{th}$ subcarrier in Pol-Y. The complete training signal for the proposed POLMUX-DD architecture consisted of at least one pair of Training sets A and B transmitted sequentially in time; equivalently, the complete training signal consisted of the time sequence: $A_X, A_Y, B_X, B_Y$.

Following training signal recovery (401), the B-S channel estimation (402) is performed by first combining the output from the four training sequences $A_X$, $A_Y$, $B_X$, $B_Y$ to form the 4×4 channel estimation matrix on each pair of OFDM sub-carriers given by $$\underbrace{\begin{bmatrix} c_{XX'}a_{XX'}(i) & c_{YX'}a_{YX'}(i) & c_{YX'}a_{XX'}(N-i+1) & c_{XX'}a_{YX'}(N-i+1) \\ c_{XY'}a_{XY'}(i) & c_{YY'}a_{YY'}(i) & c_{YY'}a_{XY'}(N-i+1) & c_{XY'}a_{YY'}(N-i+1) \\ c_{YX'}a_{XX'}(i) & c_{XX'}a_{YX'}(i) & c_{XX'}a_{XX'}(N-i+1) & c_{YX'}a_{YX'}(N-i+1) \\ c_{YY'}a_{XY'}(i) & c_{XY'}a_{YY'}(i) & c_{XY'}a_{XY'}(N-i+1) & c_{YY'}a_{YY'}(N-i+1) \end{bmatrix}}_{\text{Channel Estimation Matrix}} \times$$

$$\underbrace{\begin{bmatrix} S_{X,i} \\ S_{Y,i} \\ S_{X,N-i+1} \\ S_{Y,N-i+1} \end{bmatrix}}_{\text{Tx Signals}} + v = \underbrace{\begin{bmatrix} S_{X',i} \\ S_{Y',i} \\ S_{X',N-i+1} \\ S_{Y',N-i+1} \end{bmatrix}}_{\text{Re Signals}} = y$$

The entries in the channel estimation matrix above will also depend on the subcarrier index, i=1, 2, ... N, where N is the size of the Fast Fourier Transform used to generate the OFDM signal.

Next, the other operations in the B-S Channel Estimation (402) are detailed. In this process, v and y denote the noise vector and the vector of received symbols, respectively, wherein both v and the transmit signal vector have been normalized such that the covariance of each is the identity matrix. Also note that the columns of the channel estimation matrix have been permuted so that the entries in the transmit signal vector can be written as shown above. Let E denote the 4×4 channel estimation matrix. The module (402) partitions E into four 2×2 sub-matrices as $$E = \begin{bmatrix} E_1 & E_2 \\ E_3 & E_4 \end{bmatrix}$$

It then seeks to classify E as a matrix that lies in the set of matrices having a block-symmetric (specifically block diagonal) structure of the form $$\begin{bmatrix} A & 0 \\ 0 & C \end{bmatrix}.$$

One way to do this classification is to check if the squared Frobenius-norms of both $E_2$ and $E_3$ are less than an acceptable threshold $\mu$, which in turn can be a tunable parameter. In particular if both $\|E_i\|_F^2 \leq \mu$, i=2, 3 then we can deem E to have a block-symmetric (specifically block diagonal) structure and approximate it by the B-S channel estimation matrix $$\begin{bmatrix} E_1 & 0 \\ 0 & E_4 \end{bmatrix} = \begin{bmatrix} A & 0 \\ 0 & C \end{bmatrix}$$

Otherwise, the module seeks to classify E as a matrix that lies in the set of matrices having a block-symmetric structure of the form $$\begin{bmatrix} A & B \\ B & A \end{bmatrix}.$$

One way to do this classification is to check if $\|E_1-E_4\|_F^2 \leq \lambda$, $\|E_2-E_3\|_F^2 \leq \lambda$ where $\lambda$ can be another tunable parameter. In particular, if both $\|E_1-E_4\|_F^2 \leq \lambda$, $\|E_2-E_3\|_F^2 \leq \lambda$ then we can deem E to have block symmetric structure and approximate it by the B-S channel estimation matrix $$\begin{bmatrix} (E_1+E_4)/2 & (E_2+E_3)/2 \\ (E_2+E_3)/2 & (E_1+E_4)/2 \end{bmatrix}.$$

Otherwise the channel estimation matrix is deemed to have no structure and is considered to be an arbitrary 4×4 matrix.

In most practical scenarios, the channel estimation matrix structure will no longer be arbitrary, however, but will be very well approximated by an important block-symmetric structure which may be expressed as either $$E = \begin{bmatrix} A & B \\ B & A \end{bmatrix} \text{ or } E = \begin{bmatrix} A & 0 \\ 0 & C \end{bmatrix},$$

depending on the result of the B-S channel estimation (402) classification rule, where A, B, C are all 2×2 matrices, and 0 denotes a 2×2 matrix of all zero entries. In rare cases where the output of the B-S channel estimation module (402) produces an arbitrary 4×4 matrix, the equalization filter computation and subsequent symbol equalization can be done as is known in prior art. Henceforth, we focus on the novel cases where the B-S channel estimation matrix output is either of the form $$E = \begin{bmatrix} A & B \\ B & A \end{bmatrix} \text{ or } E = \begin{bmatrix} A & 0 \\ 0 & C \end{bmatrix}.$$

Considering first the B-S channel estimation matrix of the form $$E = \begin{bmatrix} A & B \\ B & A \end{bmatrix},$$

the B-S zero forcing (ZF) computation (403) is performed as $$H = \begin{bmatrix} P & Q \\ Q & P \end{bmatrix}$$

$$= \begin{bmatrix} A & B \\ B & A \end{bmatrix}^{-1}$$

$$= \begin{bmatrix} (A-BA^{-1}B)^{-1} & -(A-BA^{-1}B)^{-1}BA^{-1} \\ -(A-BA^{-1}B)^{-1}BA^{-1} & (A-BA^{-1}B)^{-1} \end{bmatrix}$$

In one embodiment of the B-S ZF Computation (403), H is a 4×4 matrix and both P and Q are 2×2 matrices. From the matrix, one execution of the B-S ZF computation (403) introduces only 30 additional digital multiplications, compared to 256 extra multiplications for ZF computation using a direct 4×4 matrix inversion. This translates to an order of magnitude decrease in the number of operations/second, without any loss of performance.

Using next the B-S channel estimation matrix of the form $$E = \begin{bmatrix} A & 0 \\ 0 & C \end{bmatrix},$$

the B-S zero forcing (ZF) computation (403) is performed as $$H = \begin{bmatrix} P & Q \\ Q & T \end{bmatrix} = \begin{bmatrix} A^{-1} & 0 \\ 0 & C^{-1} \end{bmatrix}$$

In another embodiment of the B-S ZF Computation (403), H is a 4×4 matrix and P, Q, T are all 2×2 matrices, where $P=A^{-1}$, $Q=0$, $T=C^{-1}$. From the matrix, one execution of the B-S ZF computation (403) introduces only 6 additional digital multiplications, needed to calculate two separate 2×2 matrix inverses, compared to 256 extra multiplications for ZF computation using a direct 4×4 matrix inversion. This translates to a two-order of magnitude decrease in the number of operations/second, without any loss of performance.

However, since ZF-based equalization enhances noise effects, the B-S channel estimation matrix can also be used for an efficient Minimum Mean Square Error (MMSE) computation (404) that removes such noise enhancement and improves performance.

Next, an exemplary B-S MMSE computation (404) using the B-S channel estimation matrix (402) of the form $$E = \begin{bmatrix} A & B \\ B & A \end{bmatrix}$$

is discussed.

$$H = \left( \begin{bmatrix} I & 0 \\ 0 & I \end{bmatrix} + \begin{bmatrix} A^* & B^* \\ B^* & A^* \end{bmatrix} \begin{bmatrix} A & B \\ B & A \end{bmatrix} \right)^{-1} \begin{bmatrix} A^* & B^* \\ B^* & A^* \end{bmatrix}$$

$$= \left( \begin{bmatrix} I + A^*A + B^*B & A^*B + B^*A \\ C & D \\ A^*B + B^*A & I + A^*A + B^*B \end{bmatrix} \right)^{-1} \begin{bmatrix} A^* & B^* \\ B^* & A^* \end{bmatrix}$$

$$= \begin{bmatrix} W & F \\ F & W \end{bmatrix} \begin{bmatrix} A^* & B^* \\ B^* & A^* \end{bmatrix}$$

$$= \begin{bmatrix} WA^* + FB^* & WB^* + FA^* \\ WB^* + FA^* & WA^* + FB^* \end{bmatrix},$$

$$W = (C - DC^{-1}D)^{-1}, \ F = -WDC^{-1}$$

H is the 4×4 B-S MMSE matrix, I denotes a 2×2 identity matrix, and $A^*$, $B^*$ denote the 2×2 matrix conjugate transpose of matrices A and B, respectively. One execution of the B-S MMSE computation (404) as shown above introduces no more than 78 additional digital multiplications, while also improving performance compared to ZF by removing ZF-based noise enhancement.

Another exemplary B-S MMSE computation (404) using the B-S channel estimation matrix (402) of the form $$E = \begin{bmatrix} A & 0 \\ 0 & C \end{bmatrix}$$

is now presented.

$$H = \left( \begin{bmatrix} (I + A^*A)^{-1}A^* & 0 \\ 0 & (I + C^*C)^{-1}C^* \end{bmatrix} \right)$$

H is the 4×4 B-S MMSE matrix, I denotes a 2×2 identity matrix, 0 denotes a 2×2 all-zeros matrix, and $A^*$, $C^*$ denote the 2×2 matrix conjugate transpose of matrices A and C, respectively. One execution of the B-S MMSE computation (404) as above introduces no more than 38 additional digital multiplications, while also improving performance compared to ZF by removing ZF-based noise enhancement.

Next, B-S Equalization (405) is performed and H may be selected to be either ZF-based (403) or MMSE-based (404) in this embodiment:

$$H \times \begin{bmatrix} S_{X',i} \\ S_{Y',i} \\ S_{X',N-i+1} \\ S_{Y',N-i+1} \end{bmatrix}$$

It is further noted that if the B-S channel estimation matrix is of the form $$E = \begin{bmatrix} A & 0 \\ 0 & C \end{bmatrix},$$

the equalization filter matrix H (for both ZF-based and MMSE-based equalization) will also be block-diagonal, so that we can expand H as $$H = \begin{bmatrix} H_1 & 0 \\ 0 & H_2 \end{bmatrix}.$$

Consequently the four-symbol equalization shown above splits into two separate two-symbol equalizations, specifically, $$H_1 \begin{bmatrix} S_{X',i} \\ S_{Y',i} \end{bmatrix} \text{ and } H_2 \begin{bmatrix} S_{X',N-i+1} \\ S_{Y',N-i+1} \end{bmatrix}.$$

From this it can be seen that the number of multiplications required for the B-S ZF (403) and B-S MMSE (404) equalization steps per OFDM symbol is reduced by 50% if the B-S channel estimation matrix is of the form $$E = \begin{bmatrix} A & 0 \\ 0 & C \end{bmatrix}.$$

Additionally, the B-S channel estimation matrix E can be used for efficient signal-to-interference-and-noise ratio (SINR) computation (406) that gives the measure of link quality. The SINR computation for the ZF-based and the MMSE-based B-S Equalization is detailed for one embodiment.

An exemplary SINR determination (406) using the B-S channel estimation matrix (402) of the form $$E = \begin{bmatrix} A & B \\ B & A \end{bmatrix}$$

is discussed first. The determination includes a B-S MMSE and B-S ZF determinations as follows:

$$SINR_{MMSE}^k = \cfrac{1}{\left[\left(\begin{bmatrix} I & 0 \\ 0 & I \end{bmatrix} + \begin{bmatrix} A^* & B^* \\ B^* & A^* \end{bmatrix}\begin{bmatrix} A & B \\ B & A \end{bmatrix}\right)^{-1}\right]_{k,k}} - 1 = \cfrac{1}{\left[\begin{bmatrix} W & F \\ F & W \end{bmatrix}\right]_{k,k}} - 1$$

$$SINR_{ZF}^k = \cfrac{1}{\left[\left(\begin{bmatrix} A^* & B^* \\ B^* & A^* \end{bmatrix}\begin{bmatrix} A & B \\ B & A \end{bmatrix}\right)^{-1}\right]_{k,k}} =$$

$$\cfrac{1}{\left[\left(\begin{bmatrix} \underbrace{A^*A + B^*B}_{G} & \underbrace{B^*A + A^*B}_{D} \\ B^*A + A^*B & A^*A + B^*B \end{bmatrix}\right)^{-1}\right]_{k,k}} = \cfrac{1}{\left[\begin{bmatrix} M & N \\ N & M \end{bmatrix}\right]_{k,k}}$$

$$M = (G - DG^{-1}D)^{-1}, N = -MDG^{-1}$$

For ZF-based B-S Equalization (403+405), the SINRs for the $i^{th}$ and $N-i+1^{th}$ OFDM subcarrier and the two polarizations are obtained from $S/NR_{ZF}^k$ that is computed above. Specifically, when k=1, 2, the SINR for the symbols on subcarrier i in each of the two polarizations is computed; likewise, when k=3, 4, the SINR for the symbols on subcarrier N−i+1 in each of the two polarizations is computed. It is noted that since much of the terms needed for B-S based SINR computation (406) were already previously computed for B-S ZF (403) and B-S MMSE (404), this step can re-use much of the previous computations and can therefore compute efficiently $S/NR_{ZF}^k$ with an additional 34 operations and $S/NR_{MMSE}^k$ with just 2 additional operations.

An exemplary SINR determination (406) using the B-S channel estimation matrix (402) of the form $$E = \begin{bmatrix} A & 0 \\ 0 & C \end{bmatrix}$$

is discussed next. The determination includes a B-S MMSE and B-S ZF determinations as follows:

$$SINR_{MMSE}^k = \cfrac{1}{\left[\begin{bmatrix} (I + A^*A)^{-1} & 0 \\ 0 & (I + C^*C)^{-1} \end{bmatrix}\right]_{k,k}} - 1$$

$$SINR_{ZF}^k = \cfrac{1}{\left[\begin{bmatrix} (A^*A)^{-1} & 0 \\ 0 & (C^*C)^{-1} \end{bmatrix}\right]_{k,k}}$$

It is noted that since much of the terms needed for B-S based SINR computation (406) using the B-S channel estimation matrix (402) of the form $$E = \begin{bmatrix} A & 0 \\ 0 & C \end{bmatrix}$$

were already previously computed for B-S ZF (403) and B-S MMSE (404) using this form of (402), this step can re-use much of the previous computations and can therefore compute efficiently $S/NR_{ZF}^k$ and $S/NR_{MMSE}^k$.

The result of SINR computation (406) is then fed back via the SSMF feedback path (500) to the Adaptive Dual-PolMux Transmitter (100), which can then adjust the modulation and coding parameters to optimize the overall transmission rate according to well-known approaches, such as water-pouring, etc. It is also noted that when the B-S channel estimation matrix has the structure of the form $$E = \begin{bmatrix} A & B \\ B & A \end{bmatrix}, \quad (402)$$

the number of distinct SINRs is one half of what it would have been if there were no structure to the matrix of (402). This way the required feedback from the receiver to the adaptive transmitter (100) is halved.

The computational advantage of the proposed B-S MIMO Equalizer (400) may thus be summarized as follows: using the B-S ZF formulation, no more than 64, 22 total digital multiplications are needed to achieve B-S based ZF computation (403) and SINR computation (406) using the with the B-S channel estimation matrix (402) of the forms $$\begin{bmatrix} A & B \\ B & A \end{bmatrix}, \begin{bmatrix} A & 0 \\ 0 & C \end{bmatrix},$$

respectively. With the B-S MMSE approach, no more than 80, 40 total digital multiplications are needed to achieve (404) and (406), with the B-S channel estimation matrix (402) of the forms $$\begin{bmatrix} A & B \\ B & A \end{bmatrix}, \begin{bmatrix} A & 0 \\ 0 & C \end{bmatrix},$$

respectively, with the added benefit of no noise enhancement. Thus, the proposed B-S MIMO Equalizer (400) performs operations (403), (404), and (406) for both ZF and MMSE using no more than either 22+40=62 total digital operations or 64+80=144 total digital operations, depending on the exact form of the B-S channel estimation matrix (402), while also enabling the adaptive POLMUX-OFDM transmitter (100). On the other hand, performing just (403) without the B-S formulation of (402) would require 256 digital multiplications, would enhance noise and would not allow transmitter-end adaptation. Moreover, with the B-S channel estimation matrix (402) of the form $$\begin{bmatrix} A & 0 \\ 0 & C \end{bmatrix},$$

the number of multiplications required in the B-S equalizer (405) is halved compared to what it would have been if there were no structure to the matrix of (402).

To exploit the notable reduction in complexity, a third still more powerful decoder that exploits the B-S Channel structure (402) to either approach or achieve theoretically optimal performance while retaining high computational efficiency is done in the B-S MIMO Equalizer (400), as shown in FIG. 4.

Using the B-S channel estimation matrix (402) of the form $$E = \begin{bmatrix} A & B \\ B & A \end{bmatrix},$$

an embodiment of this decoder consists of B-S Group MMSE Computation (407) followed by Two-Symbol Maximum Likelihood Demodulation (MLD) (408). Compared to B-S ZF (403) and B-S MMSE (404), the hybrid B-S Group MMSE/MLD decoder, (407)+(408), will most closely approach the theoretically optimal four-symbol MLD, which has exponentially increasing complexity and cannot be efficiently implemented even using the B-S channel structure (402). With $z = Hy = [z_1, z_2, z_3, z_4]^T$, the B-S Group MMSE computation (407) can be done in one embodiment as follows:

$$LL^* = G_1^* R^{-1} G_1 (I - G_1^* R^{-1} G_1)$$

$$G_1 = \begin{bmatrix} A \\ B \end{bmatrix}, G_2 = \begin{bmatrix} B \\ A \end{bmatrix}, R = \begin{bmatrix} I & 0 \\ 0 & I \end{bmatrix} + \begin{bmatrix} A & B \\ B & A \end{bmatrix} \begin{bmatrix} A & B \\ B & A \end{bmatrix}^*$$

$$G_1^* R^{-1} G_1 =$$

$$G_2^* R^{-1} G_2 = [F_1 \quad F_2] \begin{bmatrix} A^* A + B^* B \\ B^* A + A^* B \end{bmatrix} = F_1(A^* A + B^* B) + F_2(B^* A + A^* B)$$

In the B-S Group MMSE Computation (407) example above, LL* denotes a Cholesky decomposition, wherein L is a 2×2 lower triangular matrix. It is also noted that the equivalence of $G_1^* R^{-1} G_1 = G_2^* R^{-1} G_2$ is directly attributed to the B-S channel estimation structure (402), which also enables a significant re-use of previously computed B-S MMSE (404) expressions in the B-S Group MMSE computation (407).

Next, the output of (407) is fed to the Two-Symbol MLD (408). Specifically, for pair-wise joint demodulation of symbols $(S_{X,i}, S_{Y,i})$ and $(S_{X,N-i+1}, S_{Y,N-i+1})$ using the two-symbol MLD (408), the vectors $$L^{-1} \begin{bmatrix} z_1 \\ z_2 \end{bmatrix} \text{ and } L^{-1} \begin{bmatrix} z_3 \\ z_4 \end{bmatrix}$$

are needed, respectively, where $L^{-1}$ is the 2×2 inverse of L, and L is computed via B-S Group MMSE (407) as previously discussed.

To employ the Two-Symbol MLD (408) on these input vectors, the system computes MLD inputs as follows:

$$L^{-1} \begin{bmatrix} z_1 \\ z_2 \end{bmatrix} = L^{-1} G_1^* R^{-1} G_1 \begin{bmatrix} S_{X,i} \\ S_{Y,i} \end{bmatrix} + v_1$$

$$L^{-1} \begin{bmatrix} z_3 \\ z_4 \end{bmatrix} = L^{-1} G_1^* R^{-1} G_1 \begin{bmatrix} S_{X,N-i+1} \\ S_{Y,N-i+1} \end{bmatrix} + v_2$$

In the B-S-based input to the Two-Symbol MLD (408), $v_1$ and $v_2$ denote effective noise vectors each normalized to have identity matrix covariance. Given the B-S-based inputs to the Two-Symbol MLD (408) and the corresponding models discussed above, the subsequent operation of (408) can be done. The SINR computation (406) may also be performed following B-S Group MMSE (407), and fed back via the SSMF Feedback Path (500) to enable the adaptive POLMUX OFDM transmitter (100).

Using now the B-S channel estimation matrix (402) of the form $$\begin{bmatrix} A & 0 \\ 0 & C \end{bmatrix},$$

another embodiment of the two-symbol MLD that exactly achieves theoretically-optimal ML performance is now discussed. In this embodiment, the MLD inputs are computed directly from the B-S channel estimation output (402) as follows:

$$\begin{bmatrix} z_1 \\ z_2 \end{bmatrix} = \begin{bmatrix} y_1 \\ y_2 \end{bmatrix} = A \begin{bmatrix} S_{X,i} \\ S_{Y,i} \end{bmatrix} + v_1$$

$$\begin{bmatrix} z_3 \\ z_4 \end{bmatrix} = \begin{bmatrix} y_3 \\ y_4 \end{bmatrix} = C \begin{bmatrix} S_{X,N-i+1} \\ S_{Y,N-i+1} \end{bmatrix} + v_2$$

In the B-S-based input to the Two-Symbol MLD (408), $v_1$ and $v_2$ again denote effective noise vectors each normalized to have identity matrix covariance. Given the B-S-based inputs to the Two-Symbol MLD (408) and the corresponding model discussed above, the subsequent operation of (408) can be done.

Figure 7:
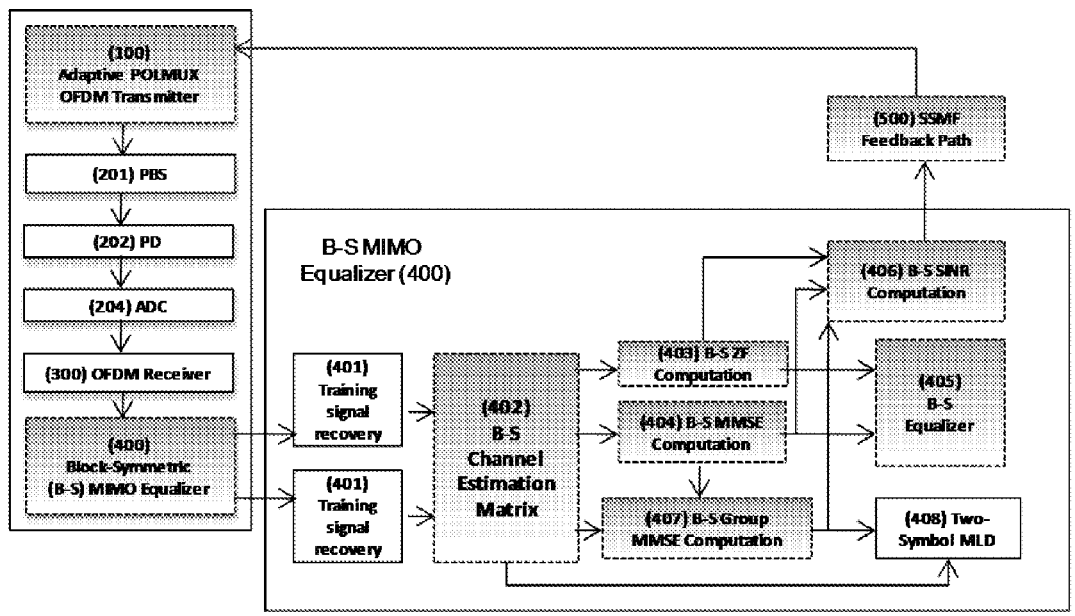
FIG. 7 shows another exemplary system with a Block-Symmetric (B-S) MIMO Equalizer (400) for POLMUX-OFDM-DD systems.

FIG. 7 shows another exemplary system with a Block-Symmetric (B-S) MIMO Equalizer (400) for POLMUX-OFDM-DD systems, which also enables an Adaptive POLMUX OFDM Transmitter (100). The system of FIG. 7 includes modules to perform B-S Channel Estimation (402), B-S ZF (403), B-S MMSE (404) and B-S Group MMSE (407) Computation, B-S Equalization (405), B-S SINR Computation (406), and the SINR feedback to the transmitter via the SSMF Feedback Path (500) to enable the Adaptive POLMUX-OFDM Transmitter (100).

In FIG. 7, the system uses the training signals (401) to form a 4×4 block symmetric (B-S) channel estimation matrix (402). The B-S ZF determination (403) is done based on (402). The B-S MMSE computation (404) is then done based on (402). The B-S Equalization (405) can then be done based on (403) or (404). The B-S Group MMSE determination can then be done based on (402) and (404). The B-S SINR determination (406) can be based on (403), (404), or (407). The feedback of SINR via the SSMF Feedback Path (500) can be provided to enable the Adaptive POLMUX-OFDM Transmitter (100). The estimation in (402) enables computationally-efficient implementations of operations (403), (404), (405), (406), and (407), which reduces complexity by an order of magnitude compared to conventional cross-polarization interference correction for POLMUX-OFDM-DD systems. Moreover, operation (404) combined with (405) also improves performance of conventional systems by removing noise enhancement, while operation (407) combined with (408) approaches optimal maximum likelihood (ML) detection while significantly reducing the computational complexity. Operation (402) combined with (408) can exactly achieve optimal maximum likelihood (ML) detection while significantly reducing the computational complexity. Finally, operation (406) combined with (500) enables an adaptive POLMUX-OFDM transmitter (100) that maximizes the transmission rate and enhances flexibility. The computational efficiency advantages are particularly important for real-time DSP-based implementations of POLMUX-OFDM-DD operating at 40+ Gb/s.

The method in FIG. 7 includes 1.) using the training signals (401) to form a 4×4 channel estimation matrix with a block-symmetric (B-S) rather than an arbitrary structure; 2.) using the block-symmetric structure (402) to compute ZF (403), MMSE (404) and Group MMSE (407) expressions rather than directly computing a 4×4 matrix inverse, and in so doing, significantly reducing the computational complexity; 3.) using the computationally-efficient MMSE (404) for B-S channel equalization (405) to improve performance by removing noise enhancement that can occur in ZF; 4.) using the computationally-efficient B-S Group MMSE (407) for Two-Symbol MLD (408) to approach theoretically optimal performance; 5.) using the B-S structure (402) for Two-Symbol MLD (408) to exactly achieve theoretically optimal performance; 6.) using the B-S structure (402) to efficiently compute the SINR (406); 7.) feeding back the SINR computation (406) via the feedback path (500) to enable an adaptive POLMUX OFDM transmitter (100) that maximizes the transmission rate and enhances flexibility compared to non-adaptive designs.

What is claimed is:

1. A polarization-multiplexed (POLMUX) optical orthogonal frequency division multiplexing (OFDM) system with direct detection, comprising:
an adaptive dual POLMUX carrier OFDM transmitter; and
a block symmetric (B-S) MIMO equalizer coupled to the adaptive dual POLMUX carrier OFDM transmitter through a standard single-mode-fiber (SSMF) feedback path,
wherein the B-S MIMO equalizer comprises a B-S channel estimator,
wherein the B-S channel estimator first uses training sequences in determining an estimation matrix such that the received symbols on subcarriers i and N−i+1 in the polarizations X' and Y' can be modeled as:

$$\underbrace{\begin{bmatrix} c_{XX'}a_{XX'}(i) & c_{YX'}a_{YX'}(i) & c_{XX'}a_{XX'}(N-i+1) & c_{XX'}a_{YX'}(N-i+1) \\ c_{XY'}a_{XY'}(i) & c_{YX'}a_{YY'}(i) & c_{YY'}a_{XY'}(N-i+1) & c_{XY'}a_{YY'}(N-i+1) \\ c_{YX'}a_{XX'}(i) & c_{XX'}a_{YX'}(i) & c_{XX'}a_{XX'}(N-i+1) & c_{YX'}a_{YX'}(N-i+1) \\ c_{YY'}a_{XY'}(i) & c_{XY'}a_{YY'}(i) & c_{YY'}a_{XY'}(N-i+1) & c_{YY'}a_{YY'}(N-i+1) \end{bmatrix}}_{\text{Channel Estimation Matrix}} \times$$

$$\underbrace{\begin{bmatrix} S_{X,i} \\ S_{Y,i} \\ S_{X,N-i+1} \\ S_{Y,N-i+1} \end{bmatrix}}_{\text{Tx Signals}} + v = \underbrace{\begin{bmatrix} S_{X',i} \\ S_{Y',i} \\ S_{X',N-i+1} \\ S_{Y',N-i+1} \end{bmatrix}}_{\text{Re Signals}} = y$$

where v and y denote a noise vector and a vector of received symbols, respectively and i=1, 2, ... N, denotes the OFDM subcarrier index, and N denotes the FFT size,
wherein the B-S channel estimator approximates the channel estimation matrix by a matrix of the form $$\begin{bmatrix} A & B \\ B & A \end{bmatrix}$$

or a matrix of the form $$\begin{bmatrix} A & 0 \\ 0 & C \end{bmatrix}$$

where A and B and C are 2×2 matrices, if the error in such approximation is below an acceptable threshold.

2. The system of claim 1, comprising a polarization beam splitter (PBS) coupled to the standard single mode fiber (SSMF), a pair of photodetectors (PD) coupled to the PBS, and an Orthogonal Frequency Division Multiplexing (OFDM) receiver coupled to each PD, wherein the OFDM receiver outputs frequency-domain OFDM signals containing cross-polarization interference to the block-symmetry multiple input multiple output (B-S MIMO) equalizer.

3. The system of claim 1, wherein the B-S MIMO equalizer comprises a B-S zero forcing module.

4. The system of claim 3, wherein the zero forcing module determines $$H = \begin{bmatrix} P & Q \\ Q & P \end{bmatrix} =$$

$$\begin{bmatrix} A & B \\ B & A \end{bmatrix}^{-1} = \begin{bmatrix} (A - BA^{-1}B)^{-1} & -(A - BA^{-1}B)^{-1}BA^{-1} \\ -(A - BA^{-1}B)^{-1}BA^{-1} & (A - BA^{-1}B)^{-1} \end{bmatrix}$$

where A and B are 2×2 matrices.

5. The system of claim 3, wherein the zero forcing module determines $$H = \begin{bmatrix} P & Q \\ Q & T \end{bmatrix} = \begin{bmatrix} A^{-1} & 0 \\ 0 & C^{-1} \end{bmatrix}$$

where A, C are 2×2 matrices and 0 is a 2×2 matrix with all zero entries.

6. The system of claim 1, wherein the B-S MIMO equalizer comprises a B-S Minimum Mean Square Error (MMSE) module.

7. The system of claim 6, wherein the MMSE module determines $$H = \left( \begin{bmatrix} I & 0 \\ 0 & I \end{bmatrix} + \begin{bmatrix} A^* & B^* \\ B^* & A^* \end{bmatrix} \begin{bmatrix} A & B \\ B & A \end{bmatrix} \right)^{-1} \begin{bmatrix} A^* & B^* \\ B^* & A^* \end{bmatrix} =$$

$$\left( \begin{bmatrix} \underbrace{I + A^*A + B^*B}_{C} & \underbrace{A^*B + B^*A}_{D} \\ A^*B + B^*A & I + A^*A + B^*B \end{bmatrix} \right)^{-1} \begin{bmatrix} A^* & B^* \\ B^* & A^* \end{bmatrix} =$$

$$\begin{bmatrix} W & F \\ F & W \end{bmatrix} \begin{bmatrix} A^* & B^* \\ B^* & A^* \end{bmatrix} = \begin{bmatrix} WA^* + FB^* & WB^* + FA^* \\ WB^* + FA^* & WA^* + FB^* \end{bmatrix},$$

$$W = (C - DC^{-1}D)^{-1}, F = -WDC^{-1}$$

where I is the 2×2 identity matrix.

8. The system of claim 6, wherein the MMSE module determines $$H = \left( \begin{bmatrix} (I + A^*A)^{-1}A^* & 0 \\ 0 & (I + C^*C)^{-1}C^* \end{bmatrix} \right).$$

9. The system of claim 1, wherein the B-S MIMO equalizer determines:

$$H \times \begin{bmatrix} S_{X',i} \\ S_{Y',i} \\ S_{X',N-i+1} \\ S_{Y',N-i+1} \end{bmatrix}.$$

10. The system of claim 1, wherein the B-S channel estimator approximates the channel estimation matrix by a matrix of the form $$\begin{bmatrix} A & 0 \\ 0 & C \end{bmatrix}$$

and the B-S MIMO equalizer separately equalizes the two received symbols on each sub-carrier corresponding to the two polarizations.

11. The system of claim 1, wherein the B-S MIMO equalizer comprises a signal-to-interference-and-noise ratio (SINR) determination module.

12. The system of claim 1, wherein the SINR determination module determines the SINR using MMSE or determines SINR using zero forcing (ZF) as follows:

$$SINR_{MMSE}^k = \cfrac{1}{\left[\left(\begin{bmatrix} I & 0 \\ 0 & I \end{bmatrix} + \begin{bmatrix} A^* & B^* \\ B^* & A^* \end{bmatrix}\begin{bmatrix} A & B \\ B & A \end{bmatrix}\right)^{-1}\right]_{k,k}} - 1 = \cfrac{1}{\left[\begin{bmatrix} W & F \\ F & W \end{bmatrix}\right]_{k,k}} - 1$$

$$SINR_{ZF}^k = \cfrac{1}{\left[\left(\begin{bmatrix} A^* & B^* \\ B^* & A^* \end{bmatrix}\begin{bmatrix} A & B \\ B & A \end{bmatrix}\right)^{-1}\right]_{k,k}} =$$

$$\cfrac{1}{\left[\left(\begin{bmatrix} \frac{A^*A+B^*B}{G} & \frac{B^*A+A^*B}{D} \\ B^*A+A^*B & A^*A+B^*B \end{bmatrix}\right)^{-1}\right]_{k,k}} = \cfrac{1}{\left[\begin{bmatrix} M & N \\ N & M \end{bmatrix}\right]_{k,k}}$$

$$M = (G - DG^{-1}D)^{-1}, N = -MDG^{-1}.$$

13. The system of claim 11, wherein the SINR determination module determines the SINR using MMSE or determines SINR using zero forcing (ZF) as follows:

$$SINR_{MMSE}^k = \cfrac{1}{\left[\begin{bmatrix} (I+A^*A)^{-1} & 0 \\ 0 & (I+C^*C)^{-1} \end{bmatrix}\right]_{k,k}}$$

$$SINR_{ZF}^k = \cfrac{1}{\left[\begin{bmatrix} (A^*A)^{-1} & 0 \\ 0 & (C^*C)^{-1} \end{bmatrix}\right]_{k,k}}.$$

14. The system of claim 1, wherein the B-S MIMO equalizer comprises a group MMSE module.

15. The system of claim 14, wherein the group MMSE module determines $$LL^* = G_1^* R^{-1} G_1 (I - G_1^* R^{-1} G_1)$$

$$G_1 = \begin{bmatrix} A \\ B \end{bmatrix}, G_2 = \begin{bmatrix} B \\ A \end{bmatrix}, R = \begin{bmatrix} I & 0 \\ 0 & I \end{bmatrix} + \begin{bmatrix} A & B \\ B & A \end{bmatrix}\begin{bmatrix} A & B \\ B & A \end{bmatrix}^*$$

$$G_1^* R^{-1} G_1 =$$

$$G_2^* R^{-1} G_2 = [F_1 \; F_2]\begin{bmatrix} A^*A+B^*B \\ B^*A+A^*B \end{bmatrix} = F_1(A^*A+B^*B) + F_2(B^*A+A^*B).$$

16. The system of claim 11, wherein the B-S MIMO equalizer includes a two symbol Maximum Likelihood Demodulation (MLD) module.

17. The system of claim 16, wherein the inputs to the two symbol MLD module are determined and modeled as $$L^{-1}\begin{bmatrix} z_1 \\ z_2 \end{bmatrix} = L^{-1} G_1^* R^{-1} G_1 \begin{bmatrix} S_{X,i} \\ S_{Y,i} \end{bmatrix} + v_1$$

$$L^{-1}\begin{bmatrix} z_3 \\ z_4 \end{bmatrix} = L^{-1} G_1^* R^{-1} G_1 \begin{bmatrix} S_{X,N-i+1} \\ S_{Y,N-i+1} \end{bmatrix} + v_2$$

where L, $G_1$, R are defined as in claim 18, $[z_1, z_2, z_3, z_4]^T = H[y_1, y_2, y_3, y_4]$ denote the equalized received symbols, where $y_1, y_2, y_3, y_4$ are the received symbols, the matrix H is determined as in claim 10 and $v_1$ and $v_2$ denote effective noise vectors each normalized to have identity matrix covariance.

18. The system of claim 16, wherein the inputs to the two symbol MLD module are modeled as $$\begin{bmatrix} z_1 \\ z_2 \end{bmatrix} = A \begin{bmatrix} S_{X,i} \\ S_{Y,i} \end{bmatrix} + v_1$$

$$\begin{bmatrix} z_3 \\ z_4 \end{bmatrix} = C \begin{bmatrix} S_{X,N-i+1} \\ S_{Y,N-i+1} \end{bmatrix} + v_2$$

where A, C are 2×2 matrices, and $[z_1, z_2, z_3, z_4] = [y_1, y_2, y_3, y_4]$ are the received symbols.

19. A method to provide equalization for a polarization-multiplexed (POLMUX) optical orthogonal frequency division multiplexing (OFDM) system with direct detection, comprising:
  in a digital signal processor, generating a channel estimation matrix from a training signal set output by the OFDM receiver and approximating it with a matrix having a block symmetric (B-S) structure;
  using the B-S structure to perform a B-S zero-forcing (ZF) operation for B-S equalization;
  using the B-S structure to perform a Minimum Mean Square Error (MMSE) operation and a group MMSE operation for B-S equalization;
  using the B-S structure to perform a B-S ZF or B-S MMSE equalization;
  using the B-S group MMSE operation to perform a Two-Symbol Maximum Likelihood Demodulation (MLD);
  using the B-S structure to perform theoretically-optimal Two-Symbol Maximum Likelihood Demodulation (MLD);
  using the B-S structure to determine signal to interference noise ratio (SINR), a metric of link quality; and
  sending SINR information to the transmitter via a standard single-mode-fiber (SSMF) feedback path to generate an adaptive POLMUX OFDM transmitter.

20. The method of claim 19, comprising performing modulation and coding format adaptation based on link quality to optimize a transmission rate.

21. The method of claim 19, comprising using training sequences $A_X, A_Y, B_X, B_Y$ in determining the channel estimation matrix:

$$\begin{bmatrix} c_{XX'}a_{XX'}(i) & c_{YX'}a_{YX'}(i) & c_{YX'}a_{XX'}(N-i+1) & c_{XX'}a_{YX'}(N-i+1) \\ c_{XY'}a_{XY'}(i) & c_{YY'}a_{YY'}(i) & c_{YY'}a_{XY'}(N-i+1) & c_{XY'}a_{YY'}(N-i+1) \\ c_{YX'}a_{XX'}(i) & c_{XX'}a_{YX'}(i) & c_{XX'}a_{XX'}(N-i+1) & c_{YX'}a_{YX'}(N-i+1) \\ c_{YY'}a_{XY'}(i) & c_{XY'}a_{YY'}(i) & c_{XY'}a_{XY'}(N-i+1) & c_{YY'}a_{YY'}(N-i+1) \end{bmatrix} \times$$

Channel Estimation Matrix

-continued $$\begin{bmatrix} S_{X,i} \\ S_{Y,i} \\ S_{X,N-i+1} \\ S_{Y,N-i+1} \end{bmatrix}_{Tx\ Signals} + v = \begin{bmatrix} S_{X',i} \\ S_{Y',i} \\ S_{X',N-i+1} \\ S_{Y',N-i+1} \end{bmatrix}_{Re\ Signals} = y,$$

where v and y denote a noise vector and a vector of received symbols, respectively, wherein both v and the transmit signal vector are normalized and have identity-matrix covariance.

22. The method of claim 19, wherein the B-S channel estimator approximates the channel estimation matrix by a matrix of the form $$\begin{bmatrix} A & B \\ B & A \end{bmatrix}$$

or a matrix of the form $$\begin{bmatrix} A & 0 \\ 0 & C \end{bmatrix},$$

where A and B and C are 2×2 matrices, if the error in such approximation is below an acceptable threshold.

23. The method of claim 19, wherein the zero forcing comprises $$H = \begin{bmatrix} P & Q \\ Q & P \end{bmatrix} =$$

$$\begin{bmatrix} A & B \\ B & A \end{bmatrix}^{-1} = \begin{bmatrix} (A-BA^{-1}B)^{-1} & -(A-BA^{-1}B)^{-1}BA^{-1} \\ -(A-BA^{-1}B)^{-1}BA^{-1} & (A-BA^{-1}B)^{-1} \end{bmatrix}$$

where A and B are 2×2 matrices.

24. The method of claim 19, wherein the zero forcing comprises $$H = \begin{bmatrix} P & Q \\ Q & T \end{bmatrix} = \begin{bmatrix} A^{-1} & 0 \\ 0 & C^{-1} \end{bmatrix}$$

where A, C are 2×2 matrices and 0 is a 2×2 matrix with all zero entries.

25. The method of claim 19, wherein the MMSE module determines $$H = \left( \begin{bmatrix} I & 0 \\ 0 & I \end{bmatrix} + \begin{bmatrix} A^* & B^* \\ B^* & A^* \end{bmatrix} \begin{bmatrix} A & B \\ B & A \end{bmatrix} \right)^{-1} \begin{bmatrix} A^* & B^* \\ B^* & A^* \end{bmatrix} =$$

$$\left( \begin{bmatrix} \frac{I+A^*A+B^*B}{C} & \frac{A^*B+B^*A}{D} \\ A^*B+B^*A & I+A^*A+B^*B \end{bmatrix} \right)^{-1}$$

$$\begin{bmatrix} A^* & B^* \\ B^* & A^* \end{bmatrix} = \begin{bmatrix} W & F \\ F & W \end{bmatrix} \begin{bmatrix} A^* & B^* \\ B^* & A^* \end{bmatrix} = \begin{bmatrix} WA^*+FB^* & WB^*+FA^* \\ WB^*+FA^* & WA^*+FB^* \end{bmatrix},$$

$$W = (C - DC^{-1}D)^{-1}, F = -WDC^{-1}.$$

26. The method of claim 19, wherein the MMSE module determines $$H = \left( \begin{bmatrix} (I+A^*A)^{-1}A^* & 0 \\ 0 & (I+C^*C)^{-1}C^* \end{bmatrix} \right).$$

27. The method of claim 19, wherein the B-S group MMSE module determines $$LL^* = G_1^* R^{-1} G_1 (I - G_1^* R^{-1} G_1)$$

$$G_1 = \begin{bmatrix} A \\ B \end{bmatrix}, G_2 = \begin{bmatrix} B \\ A \end{bmatrix}, R = \begin{bmatrix} I & 0 \\ 0 & I \end{bmatrix} + \begin{bmatrix} A & B \\ B & A \end{bmatrix} \begin{bmatrix} A & B \\ B & A \end{bmatrix}^*$$

$$G_1^* R^{-1} G_1 =$$

$$G_2^* R^{-1} G_2 = [F_1 \ F_2] \begin{bmatrix} A^*A + B^*B \\ B^*A + A^*B \end{bmatrix} = F_1(A^*A + B^*B) + F_2(B^*A + A^*B).$$

28. The method of claim 19, wherein the two symbol MLD module determines $$L^{-1} \begin{bmatrix} z_1 \\ z_2 \end{bmatrix} = L^{-1} G_1^* R^{-1} G_1 \begin{bmatrix} S_{X,i} \\ S_{Y,i} \end{bmatrix} + v_1$$

$$L^{-1} \begin{bmatrix} z_3 \\ z_4 \end{bmatrix} = L^{-1} G_1^* R^{-1} G_1 \begin{bmatrix} S_{X,N-i+1} \\ S_{Y,N-i+1} \end{bmatrix} + v_2$$

where L, $G_1$, R are defined as in claim 18, $z_1$, $z_2$, $z_3$, $z_4$ denote received symbols, and $v_1$ and $v_2$ denote effective noise vectors each normalized to have identity matrix covariance.

29. The method of claim 19, wherein the two symbol MLD module determines $$\begin{bmatrix} z_1 \\ z_2 \end{bmatrix} = A \begin{bmatrix} S_{X,i} \\ S_{Y,i} \end{bmatrix} + v_1$$

$$\begin{bmatrix} z_3 \\ z_4 \end{bmatrix} = C \begin{bmatrix} S_{X,N-i+1} \\ S_{Y,N-i+1} \end{bmatrix} + v_2$$

where A, C are 2×2 matrices, and no additional filtering is needed at the two-symbol MLD outputs to achieve theoretically optimal performance.

30. A polarization-multiplexed (POLMUX) optical orthogonal frequency division multiplexing (OFDM) system with direct detection, comprising:
an adaptive dual POLMUX carrier OFDM transmitter; and
a block symmetric (B-S) MIMO equalizer coupled to the adaptive dual POLMUX carrier OFDM transmitter through a standard single-mode-fiber (SSMF) feedback path, the B-S MIMO equalizer generating a channel estimation matrix with a block symmetric (B-S) structure; using the B-S structure to perform a B-S zero-forcing (ZF) operation for B-S equalization; using the B-S structure to perform a Minimum Mean Square Error (MMSE) operation and a group MMSE operation to perform B-S equalization; using the B-S group MMSE operation to perform a Two-Symbol Maximum Likelihood Demodulation (MLD); using the B-S structure to perform theoretically-optimal Two-Symbol Maximum Likelihood Demodulation (MLD); using the B-S structure to determine signal to interference and noise ratio (SINR); and sending SINR information to the transmitter via a standard single-mode-fiber (SSMF) feedback path to generate an adaptive POLMUX OFDM transmitter.

* * * * *